United States Patent
Vaday et al.

(10) Patent No.: US 12,141,362 B2
(45) Date of Patent: Nov. 12, 2024

(54) FINGERSPELLING TEXT ENTRY

(71) Applicant: Snap Inc., Santa Monica, CA (US)

(72) Inventors: Austin Vaday, Laguna Nigel, CA (US); Rebecca Jean Lee, Los Angeles, CA (US); Jennica Pounds, Cape Coral, FL (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/660,965

(22) Filed: Apr. 27, 2022

(65) Prior Publication Data
US 2023/0350495 A1    Nov. 2, 2023

(51) Int. Cl.
| | | |
|---|---|---|
| *G06F 3/01* | (2006.01) | |
| *G02B 27/01* | (2006.01) | |
| *G06T 11/60* | (2006.01) | |
| *G06T 19/00* | (2011.01) | |
| *G06V 20/20* | (2022.01) | |
| *G06V 40/10* | (2022.01) | |
| *G06V 40/20* | (2022.01) | |

(52) U.S. Cl.
CPC ......... *G06F 3/017* (2013.01); *G02B 27/0101* (2013.01); *G02B 27/017* (2013.01); *G06F 3/011* (2013.01); *G06T 11/60* (2013.01); *G06T 19/006* (2013.01); *G06V 20/20* (2022.01); *G06V 40/113* (2022.01); *G06V 40/28* (2022.01); *G02B 2027/0138* (2013.01); *G02B 2027/014* (2013.01); *G02B 2027/0178* (2013.01)

(58) Field of Classification Search
CPC ..... G06F 3/017; G06F 3/011; G02B 27/0101; G02B 2027/0138; G02B 2027/014; G02B 27/017; G02B 2027/0178; G06T 11/60; G06T 19/006; G06V 20/20; G06V 40/113; G06V 40/28
See application file for complete search history.

(56) References Cited

U.S. PATENT DOCUMENTS

| 6,513,009 B1 | 1/2003 | Comerford et al. |
|---|---|---|
| 7,971,156 B2 | 6/2011 | Albertson et al. |
| (Continued) | | |

FOREIGN PATENT DOCUMENTS

| CN | 103049761 B | 8/2016 |
|---|---|---|
| EP | 3707693 A1 | 9/2020 |
| (Continued) | | |

OTHER PUBLICATIONS

"U.S. Appl. No. 17/657,911, Final Office Action mailed Jun. 9, 2023", 30 pgs.

(Continued)

*Primary Examiner* — Rami R Okasha
(74) *Attorney, Agent, or Firm* — Schwegman Lundberg & Woessner, P.A.

(57) ABSTRACT

A text entry process for an Augmented Reality (AR) system. The AR system detects, using one or more cameras of the AR system, a start text entry gesture made by a user of the AR system. During text entry, the AR system detects, using the one or more cameras, a symbol corresponding to a fingerspelling sign made by the user. The AR system generates entered text data based on the symbol and provides text in a text scene component of an AR overlay provided by the AR system to the user based on the entered text data.

21 Claims, 12 Drawing Sheets

(56) References Cited

U.S. PATENT DOCUMENTS

| | | | |
|---|---|---|---|
| 7,996,793 B2 | 8/2011 | Latta et al. | |
| 8,487,938 B2 | 7/2013 | Latta et al. | |
| 8,856,691 B2 | 10/2014 | Geisner et al. | |
| 9,207,852 B1* | 12/2015 | Zhou | G06F 3/0425 |
| 9,225,897 B1 | 12/2015 | Sehn et al. | |
| 9,230,160 B1 | 1/2016 | Kanter | |
| 9,276,886 B1 | 3/2016 | Samaranayake | |
| 9,705,831 B2 | 7/2017 | Spiegel | |
| 9,742,713 B2 | 8/2017 | Spiegel et al. | |
| 10,102,423 B2 | 10/2018 | Shaburov et al. | |
| 10,284,508 B1 | 5/2019 | Allen et al. | |
| 10,423,237 B2* | 9/2019 | Episkopos | G06F 3/0482 |
| 10,439,972 B1 | 10/2019 | Spiegel et al. | |
| 10,509,466 B1 | 12/2019 | Miller et al. | |
| 10,514,876 B2 | 12/2019 | Sehn | |
| 10,579,869 B1 | 3/2020 | Xiong et al. | |
| 10,614,855 B2 | 4/2020 | Huang | |
| 10,748,347 B1 | 8/2020 | Li et al. | |
| 10,877,568 B2* | 12/2020 | Huang | G06N 3/0454 |
| 10,958,608 B1 | 3/2021 | Allen et al. | |
| 10,962,809 B1 | 3/2021 | Castañeda | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,157,725 B2* | 10/2021 | Andersen | G06V 10/764 |
| 11,169,600 B1 | 11/2021 | Canberk et al. | |
| 11,227,626 B1 | 1/2022 | Krishnan Gorumkonda et al. | |
| 11,307,747 B2 | 4/2022 | Dancie et al. | |
| 11,308,266 B1* | 4/2022 | Estrada Diaz | G06F 3/017 |
| 11,531,402 B1* | 12/2022 | Stolzenberg | G06F 3/04815 |
| 11,546,505 B2 | 1/2023 | Canberk | |
| 2009/0012788 A1 | 1/2009 | Gilbert et al. | |
| 2010/0050133 A1* | 2/2010 | Nishihara | G06F 3/017 |
| | | | 715/863 |
| 2010/0199232 A1 | 8/2010 | Mistry et al. | |
| 2010/0304813 A1 | 12/2010 | Finocchio et al. | |
| 2011/0258537 A1* | 10/2011 | Rives | G06F 3/04883 |
| | | | 715/255 |
| 2011/0274311 A1* | 11/2011 | Lee | G06K 9/00 |
| | | | 381/74 |
| 2011/0301934 A1 | 12/2011 | Tardif | |
| 2012/0078614 A1* | 3/2012 | Galor | G06F 40/274 |
| | | | 704/9 |
| 2012/0113241 A1 | 5/2012 | Sundaresan et al. | |
| 2012/0297400 A1 | 11/2012 | Hill et al. | |
| 2013/0051614 A1* | 2/2013 | Lee | G06V 40/28 |
| | | | 382/103 |
| 2013/0211843 A1 | 8/2013 | Clarkson | |
| 2013/0263042 A1 | 10/2013 | Buening | |
| 2014/0171036 A1 | 6/2014 | Simmons | |
| 2014/0282270 A1 | 9/2014 | Slonneger | |
| 2014/0282272 A1 | 9/2014 | Kies | |
| 2015/0012426 A1 | 1/2015 | Purves et al. | |
| 2015/0029092 A1 | 1/2015 | Holz et al. | |
| 2015/0120293 A1 | 4/2015 | Wohlert et al. | |
| 2015/0370320 A1 | 12/2015 | Connor | |
| 2015/0378158 A1 | 12/2015 | Lundberg | |
| 2015/0381714 A1 | 12/2015 | Hawkins | |
| 2016/0026253 A1 | 1/2016 | Bradski et al. | |
| 2016/0109954 A1 | 4/2016 | Harris et al. | |
| 2017/0123487 A1 | 5/2017 | Hazra et al. | |
| 2017/0220856 A1* | 8/2017 | Mohandes | G06K 9/629 |
| 2017/0255771 A1 | 9/2017 | Miyakawa | |
| 2017/0277684 A1* | 9/2017 | Dharmarajan Mary | |
| | | | G10L 13/00 |
| 2017/0277685 A1 | 9/2017 | Takumi | |
| 2017/0351910 A1 | 12/2017 | Elwazer et al. | |
| 2018/0048859 A1* | 2/2018 | Episkopos | G06F 3/017 |
| 2018/0075659 A1* | 3/2018 | Browy | G06F 1/163 |
| 2018/0114366 A1* | 4/2018 | Ivers | G06T 11/00 |
| 2018/0158370 A1 | 6/2018 | Pryor | |
| 2019/0073525 A1* | 3/2019 | Kim | G06K 9/00503 |
| 2019/0339837 A1* | 11/2019 | Furtwangler | G06F 3/014 |
| 2019/0340426 A1 | 11/2019 | Rangarajan et al. | |
| 2020/0387214 A1* | 12/2020 | Ravasz | G06F 3/0233 |
| 2021/0011612 A1 | 1/2021 | Dancie et al. | |
| 2021/0074016 A1 | 3/2021 | Li et al. | |
| 2021/0090394 A1 | 3/2021 | Russ et al. | |
| 2021/0166732 A1 | 6/2021 | Shaburova et al. | |
| 2021/0174034 A1 | 6/2021 | Retek et al. | |
| 2021/0240331 A1* | 8/2021 | Olson | G06F 3/013 |
| 2021/0241529 A1 | 8/2021 | Cowburn et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0382564 A1 | 12/2021 | Blachly et al. | |
| 2021/0382605 A1* | 12/2021 | Edwards | G06F 3/011 |
| 2021/0397000 A1 | 12/2021 | Rodriguez, II | |
| 2021/0405761 A1 | 12/2021 | Canberk | |
| 2022/0046310 A1 | 2/2022 | Shin et al. | |
| 2022/0121344 A1* | 4/2022 | Pastrana Vicente | G06F 3/0484 |
| 2022/0188539 A1* | 6/2022 | Chan | G06F 1/163 |
| 2022/0206588 A1 | 6/2022 | Canberk et al. | |
| 2022/0300730 A1 | 9/2022 | Eirinberg et al. | |
| 2022/0300731 A1 | 9/2022 | Eirinberg et al. | |
| 2022/0326781 A1 | 10/2022 | Hwang et al. | |
| 2022/0334649 A1 | 10/2022 | Hwang et al. | |
| 2023/0315208 A1 | 10/2023 | Moll et al. | |

FOREIGN PATENT DOCUMENTS

| | | | |
|---|---|---|---|
| KR | 20120132096 A | 12/2012 | |
| KR | 20160137253 A | 11/2016 | |
| KR | 20220158824 A | 12/2022 | |
| WO | WO-2013093906 A1 | 6/2013 | |
| WO | WO-2016168591 A1 | 10/2016 | |
| WO | WO-2018170512 A1 | 9/2018 | |
| WO | WO-2019079895 A1 | 5/2019 | |
| WO | WO-2019094618 A1 | 5/2019 | |
| WO | WO-2022005687 A1 | 1/2022 | |
| WO | WO-2022005693 A1 | 1/2022 | |
| WO | WO-2022060549 A2 | 3/2022 | |
| WO | WO-2022066578 A1 | 3/2022 | |
| WO | WO-2022132381 A1 | 6/2022 | |
| WO | WO-2022146678 A1 | 7/2022 | |
| WO | WO-2022198182 A1 | 9/2022 | |
| WO | WO-2022216784 A1 | 10/2022 | |
| WO | WO-2022225761 A1 | 10/2022 | |
| WO | WO-2022245765 A1 | 11/2022 | |
| WO | WO-2023154544 A1 | 8/2023 | |
| WO | WO-2023212633 A1 | 11/2023 | |

OTHER PUBLICATIONS

"U.S. Appl. No. 17/657,911, Non Final Office Action mailed Dec. 22, 2022", 29 pgs.

"U.S. Appl. No. 17/657,911, Response filed Mar. 22, 2023 to Non Final Office Action mailed Dec. 22, 2022", 15 pgs.

"U.S. Appl. No. 17/657,911, Response filed Sep. 11, 2023 to Final Office Action mailed Jun. 9, 2023", 11 pgs.

"International Application Serial No. PCT/US2023/012994, International Search Report mailed Jul. 13, 2023", 5 pgs.

"International Application Serial No. PCT/US2023/012994, Written Opinion mailed Jul. 13, 2023", 8 pgs.

"International Application Serial No. PCT/US2023/016950, International Search Report mailed Jun. 29, 2023", 4 pgs.

"International Application Serial No. PCT/US2023/016950, Written Opinion mailed Jun. 29, 2023", 4 pgs.

"International Application Serial No. PCT/US2023/066284, International Search Report mailed Jul. 24, 2023", 4 pgs.

"International Application Serial No. PCT/US2023/066284, Written Opinion mailed Jul. 24, 2023", 6 pgs.

(56) References Cited

OTHER PUBLICATIONS

Khalid, Muhammad Usman, et al., "Deep Workpiece Region Segmentation for Bin Picking", IEEE 15th International Conference on Automation Science and Engineering (CASE), IEEE, (Aug. 22, 2019), 7 pgs.

Ng, et al., "Real-time gesture recognition system and application", Image and Vision Computing 20, (2002), 993-1007.

"U.S. Appl. No. 17/657,911, Non Final Office Action mailed Oct. 23, 2023", 37 pgs.

"U.S. Appl. No. 17/657,911, Response filed Jan. 23, 2024 to Non Final Office Action mailed Oct. 23, 2023", 12 pgs.

"U.S. Appl. No. 17/657,911, Final Office Action mailed Apr. 3, 2024", 37 pgs.

\* cited by examiner

FINGERSPELLING TEXT ENTRY

TECHNICAL FIELD

The present disclosure relates generally to user interfaces and more particularly to user interfaces used in augmented and virtual reality.

BACKGROUND

A head-worn AR system may be implemented with a transparent or semi-transparent display through which a user of the head-worn AR system can view the surrounding environment. Such devices enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-worn AR system may additionally completely occlude a user's visual field and display a virtual environment through which a user may move or be moved. This is typically referred to as "virtual reality" or "VR." As used herein, the term AR refers to either or both augmented reality and virtual reality as traditionally understood, unless the context indicates otherwise.

A user of the head-worn AR system may access and use computer software applications to perform various tasks or engage in an entertaining activity. Performing the tasks or engaging in the entertaining activity may include entry of text. To enter the text, the user interacts with a text entry user interface provided by the head-worn AR system.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
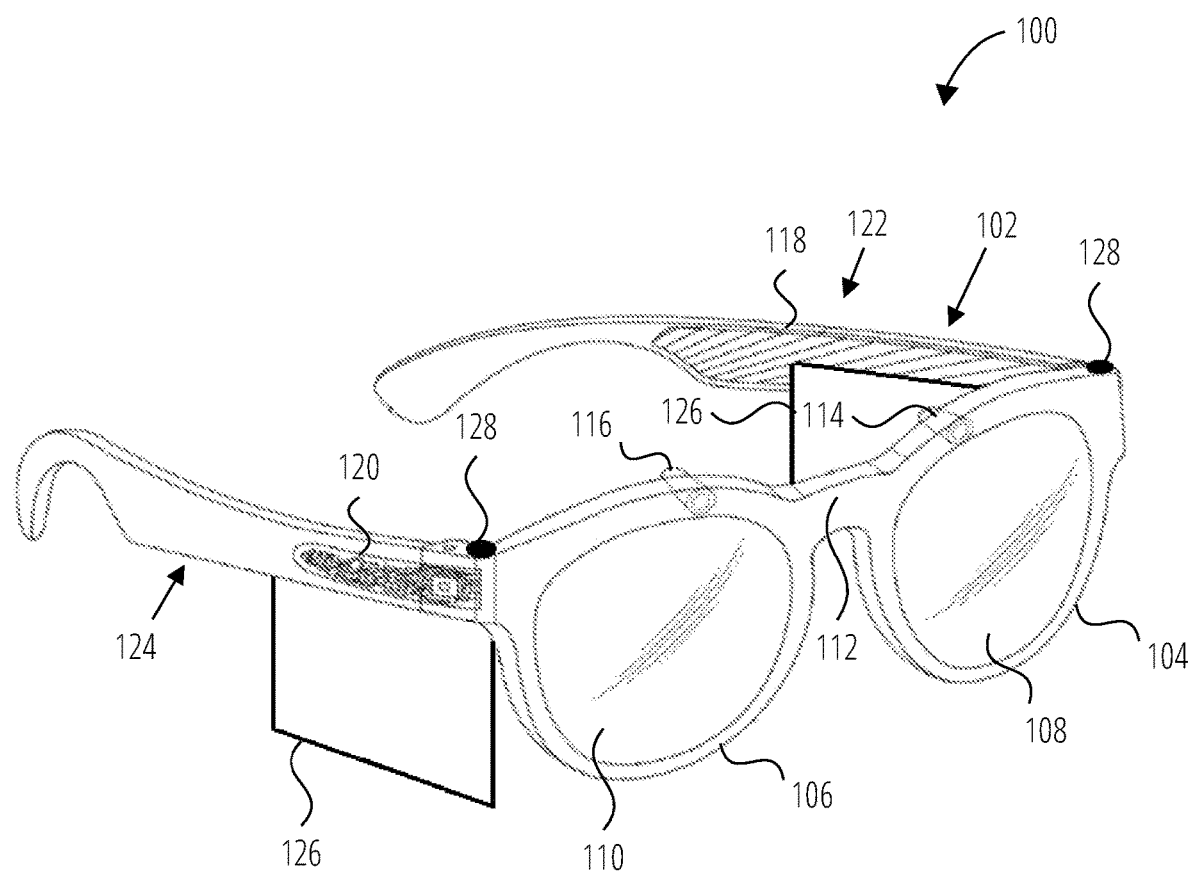
FIG. 1 is a perspective view of a head-worn device in accordance with some examples.

AR systems are limited when it comes to available user input modalities. As compared other mobile devices, such as mobile phones, it is more complicated for a user of an AR system to indicate user intent and invoke an action or application. When using a mobile phone, a user may go to a home screen and tap on a specific icon to start an application. However, because of a lack of a physical input device such as a touchscreen or keyboard, such interactions are not as easily performed on an AR system. Typically, users can indicate their intent by pressing a limited number of hardware buttons or using a small touchpad. Therefore, it would be desirable to have an input modality that allowed for a greater range of inputs that could be utilized by a user to indicate their intent through a user input.

Gestures are an input modality suitable for use with AR systems. Gestures are made by a user moving and positioning their hands and fingers while the user's hands are detectable by an AR system while the user is wearing the AR system. Components of a gesture may include the movement of the user's hands and fingers, location of the user's hands in space, and positions in which the user holds their hands and fingers. Gestures are useful in providing an AR experience for a user as they offer a way of providing user inputs into the AR system during an AR experience without having the user take their focus off of the AR experience. As an example, in an AR experience that is an operational manual for a piece of machinery, the user may simultaneously view the piece of machinery in the real-world scene environment through the lenses of the AR system, view an AR overlay on the real-world scene environment view of the machinery, and provide user inputs into the AR system.

Fingerspelling is a form of gesturing where a user makes fingerspelling signs with one of their hands indicating letters in an alphabet and numerals to be entered into a text field in an AR experience. Additional signs can be used to indicate editing commands for entered text.

In some examples, and AR system utilizes gesture recognition and fingerspelling as input modalities to provide text entry into an AR experience provided by the AR system. The AR system detects a start text entry gesture made by a user and starts text entry. The user makes fingerspelling signs to enter characters and numerals into a text object of an overlay of an AR experience. When the user is finished entering text, the user makes an end text entry gesture to terminate text entry.

In additional examples, a system framework component determines if a gesture or fingerspelling sign should be directed to a target AR application component or if the gesture or or fingerspelling sign is an undirected gesture or fingerspelling sign that should be routed to a system user interface component. The system framework component detects the start text entry gesture and determines that data of subsequent gestures and fingerspelling signs made by the user should be routed to a fingerspelling text entry application component. The fingerspelling text entry application component receives data of the subsequent gestures and fingerspelling signs made by the user.

Other technical features may be readily apparent to one skilled in the art from the following figures, descriptions, and claims.

FIG. 1 is a perspective view of an AR system in the form of a head-worn device (e.g., glasses 100 of FIG. 1), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of computer 120 may be implemented as illustrated by the data processor 702 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real-world scene environment scene.

The glasses 100 may also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
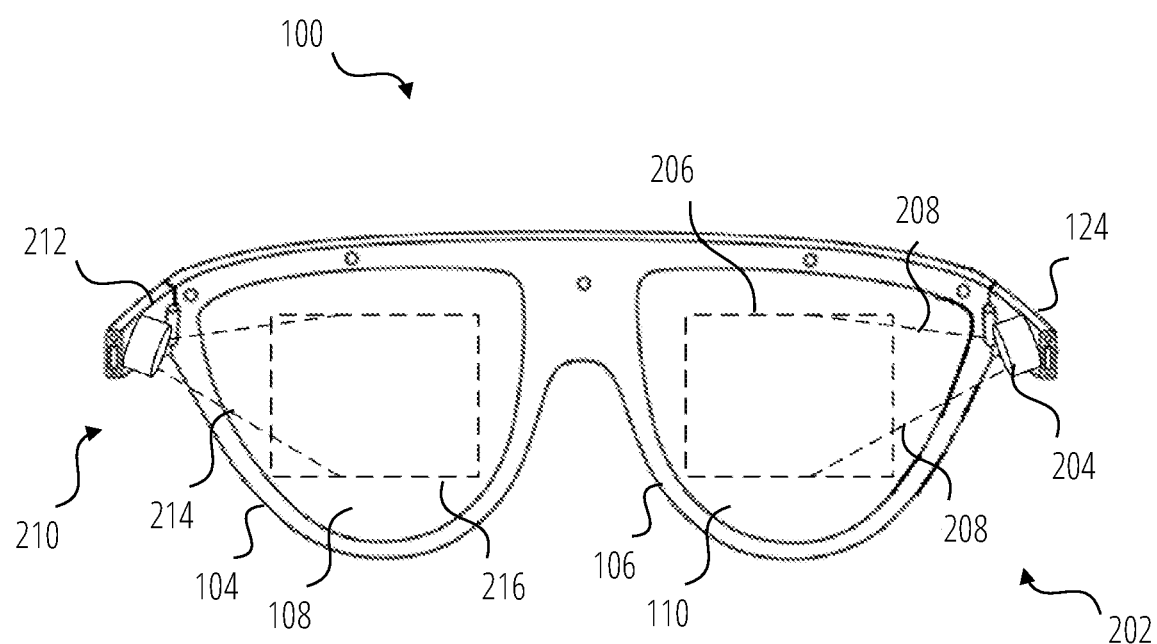
FIG. 2 illustrates a further view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real-world scene environment seen by the user. Similarly, light 214 emitted by the projector 212 encounters the diffractive structures of the waveguide of the near eye display 216, which directs the light towards the left eye of a user to provide an image on or in the left optical element 108 that overlays the view of the real-world scene environment seen by the user. The combination of a GPU, the forward optical assembly 202, the left optical element 108, and the right optical element 110 provide an optical engine of the glasses 100. The glasses 100 use the optical engine to generate an overlay of the real-world scene environment view of the user including display of a user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various user interfaces on the near eye displays. As described in more detail herein, the user can then interact with the glasses 100 using a touchpad 126 and/or the buttons 128, voice inputs or touch inputs on an associated device (e.g., client device 726 illustrated in FIG. 7), and/or hand movements, locations, and positions detected by the glasses 100.

Figure 3:
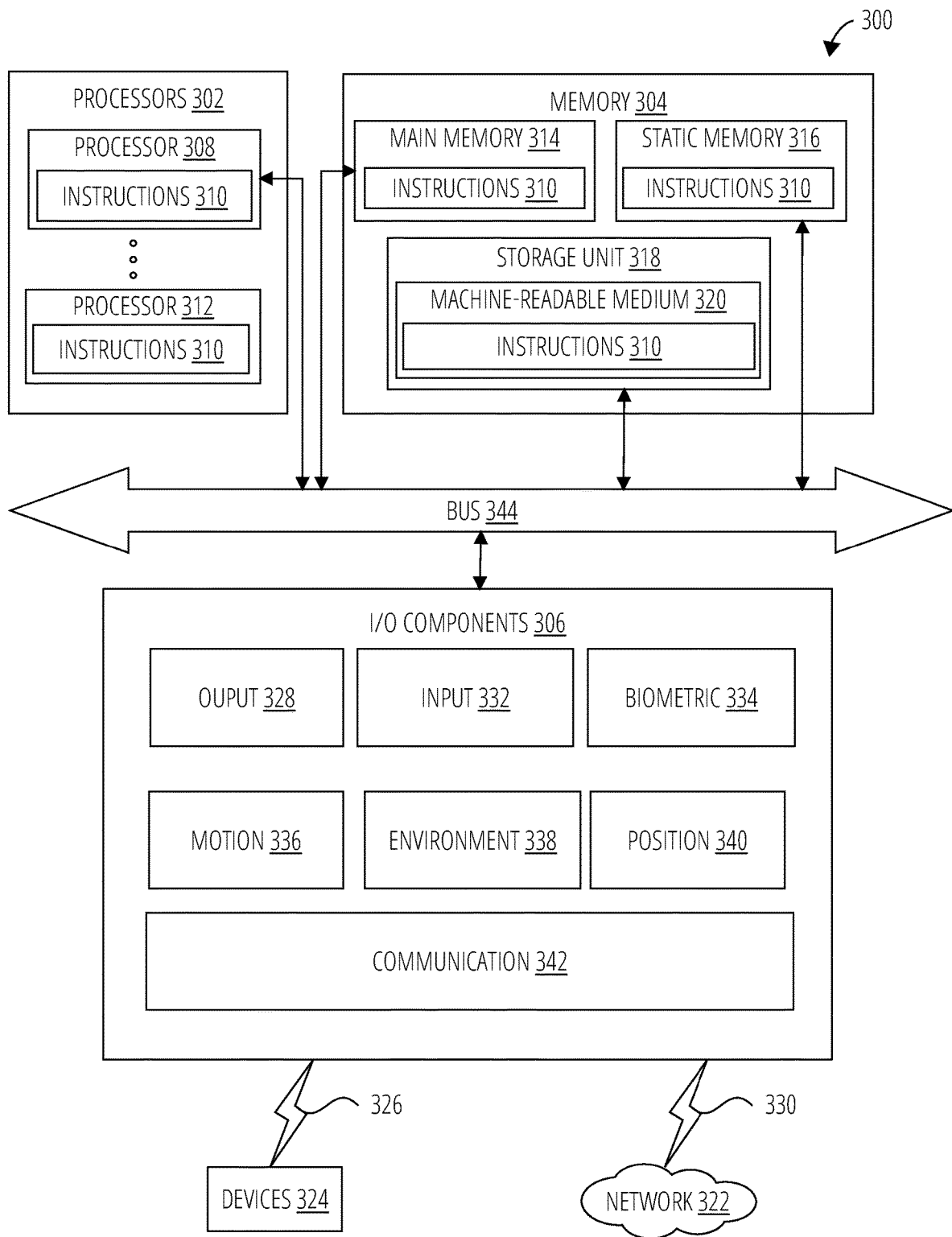
FIG. 3 is a diagrammatic representation of a machine, in the form of a computing apparatus within which a set of instructions may be executed for causing the machine to perform any one or more of the methodologies discussed herein in accordance with some examples.

FIG. 3 is a diagrammatic representation of a machine 300 (such as a computing apparatus) within which instructions 310 (e.g., software, a program, an application, an applet, an app, or other executable code) for causing the machine 300 to perform any one or more of the methodologies discussed herein may be executed. The machine 300 may be utilized as a computer 120 of glasses 100 of FIG. 1. For example, the instructions 310 may cause the machine 300 to execute any one or more of the methods described herein. The instructions 310 transform the general, non-programmed machine 300 into a particular machine 300 programmed to carry out the described and illustrated functions in the manner described. The machine 300 may operate as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment. The machine 300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, an AR system, a smart home device (e.g., a smart appliance), other smart devices, a web appliance, a network router, a network switch, a network bridge, or any machine capable of executing the instructions 310, sequentially or otherwise, that specify actions to be taken by the machine 300. Further, while a single machine 300 is illustrated, the term "machine" may also be taken to include a collection of machines that individually or jointly execute the instructions 310 to perform any one or more of the methodologies discussed herein.

The machine 300 may include processors 302, memory 304, and I/O components 306, which may be configured to communicate with one another via a bus 344. In some examples, the processors 302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 308 and a processor 312 that execute the instructions 310. The term "processor" is intended to include multi-core processors that may comprise two or more independent processors (sometimes referred to as "cores") that may execute instructions contemporaneously. Although FIG. 3 shows multiple processors 302, the machine 300 may include a single processor with a single core, a single processor with multiple cores (e.g., a multi-core processor), multiple processors with a single core, multiple processors with multiples cores, or any combination thereof.

The memory 304 includes a main memory 314, a static memory 316, and a storage unit 318, both accessible to the processors 302 via the bus 344. The main memory 304, the static memory 316, and storage unit 318 store the instructions 310 embodying any one or more of the methodologies or functions described herein. The instructions 310 may also reside, completely or partially, within the main memory 314, within the static memory 316, within machine-readable medium 320 within the storage unit 318, within one or more of the processors 302 (e.g., within the processor's cache memory), or any suitable combination thereof, during execution thereof by the machine 300.

The I/O components 306 may include a wide variety of components to receive input, provide output, produce output, transmit information, exchange information, capture measurements, and so on. The specific I/O components 306 that are included in a particular machine will depend on the type of machine. For example, portable machines such as mobile phones may include a touch input device or other such input mechanisms, while a headless server machine will likely not include such a touch input device. It will be appreciated that the I/O components 306 may include many other components that are not shown in FIG. 3. In various examples, the I/O components 306 may include output components 328 and input components 332. The output components 328 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 332 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 306 may include biometric components 334, motion components 336, environmental components 338, or position components 340, among a wide array of other components. For example, the biometric components 334 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 336 may include inertial measurement units (IMUs), acceleration sensor components (e.g., accelerometer), gravitation sensor components, rotation sensor components (e.g., gyroscope), and so forth. The environmental components 338 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding physical environment. The position components 340 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 306 further include communication components 342 operable to couple the machine 300 to a network 322 or devices 324 via a coupling 330 and a coupling 326, respectively. For example, the communication components 342 may include a network interface component or another suitable device to interface with the network 322. In further examples, the communication components 342 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 324 may be another machine or any of a wide variety of peripheral devices (e.g., a peripheral device coupled via a USB).

Moreover, the communication components 342 may detect identifiers or include components operable to detect identifiers. For example, the communication components 342 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 342, such as location via Internet Protocol (IP) geolocation, location via Wi-Fi® signal triangulation, location via detecting an NFC beacon signal that may indicate a particular location, and so forth.

The various memories (e.g., memory 304, main memory 314, static memory 316, and/or memory of the processors 302) and/or storage unit 318 may store one or more sets of instructions and data structures (e.g., software) embodying or used by any one or more of the methodologies or functions described herein. These instructions (e.g., the instructions 310), when executed by processors 302, cause various operations to implement the disclosed examples.

The instructions 310 may be transmitted or received over the network 322, using a transmission medium, via a network interface device (e.g., a network interface component included in the communication components 342) and using any one of a number of well-known transfer protocols (e.g., hypertext transfer protocol (HTTP)). Similarly, the instructions 310 may be transmitted or received using a transmission medium via the coupling 326 (e.g., a peer-to-peer coupling) to the devices 324.

Figure 4A:
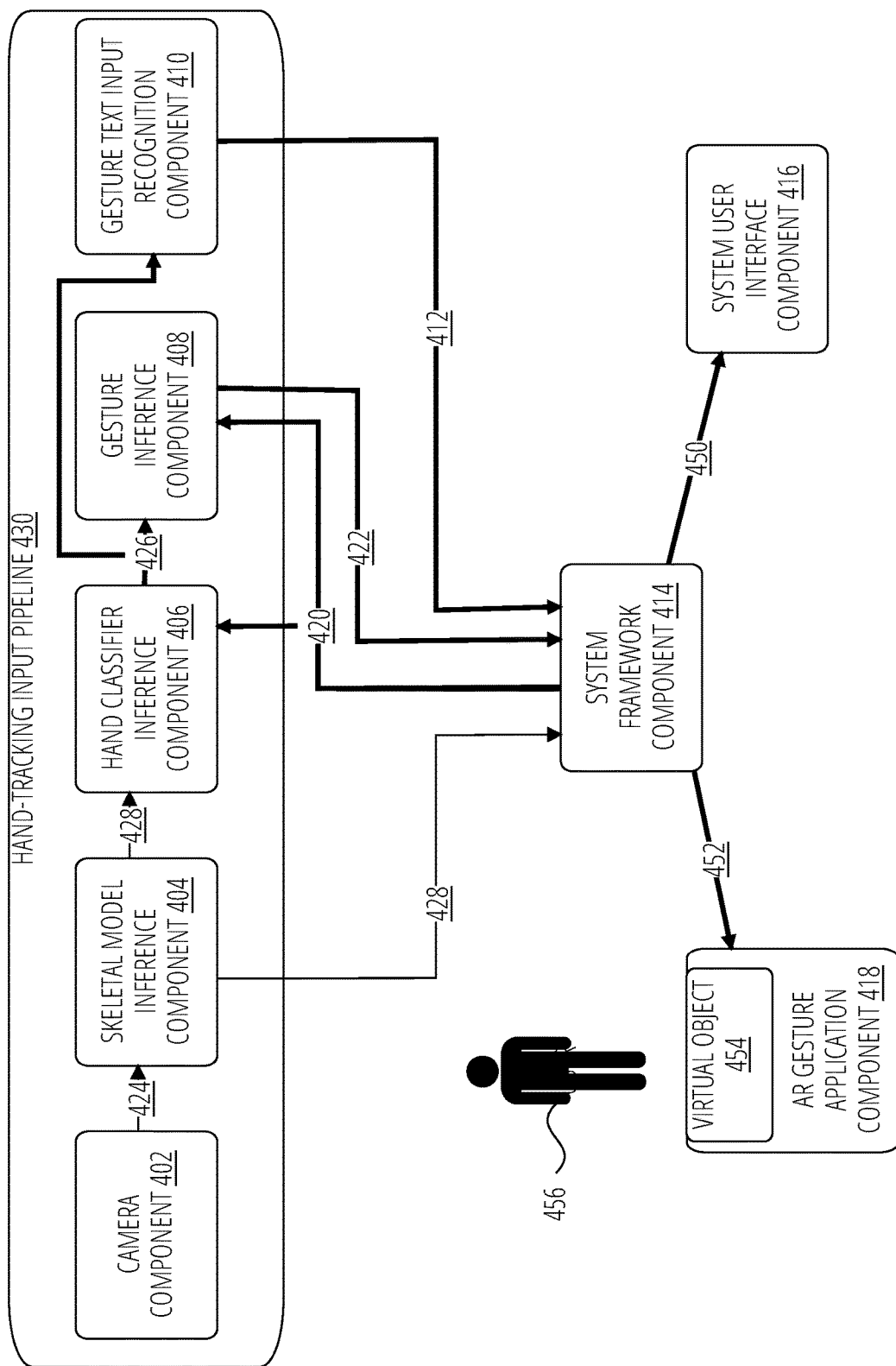
FIG. 4A is collaboration diagram of a hand-tracking input pipeline 430 of an AR system, such as glasses 100, in accordance with some examples.
Figure 4B:
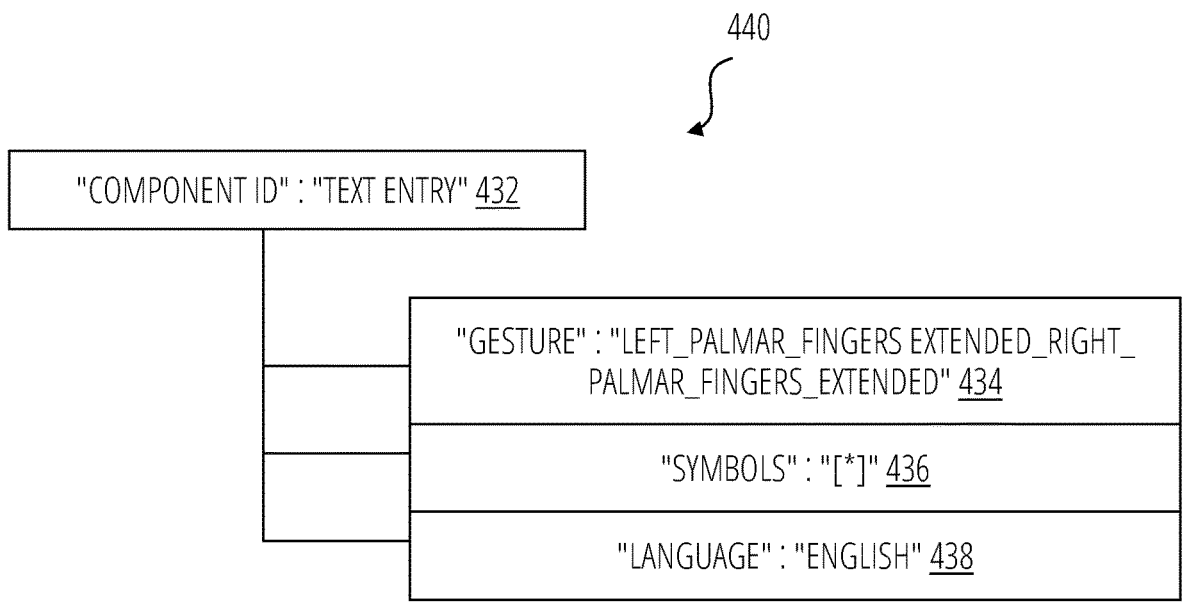
FIG. 4B is an illustration of a data structure in accordance with some examples.
Figure 4C:
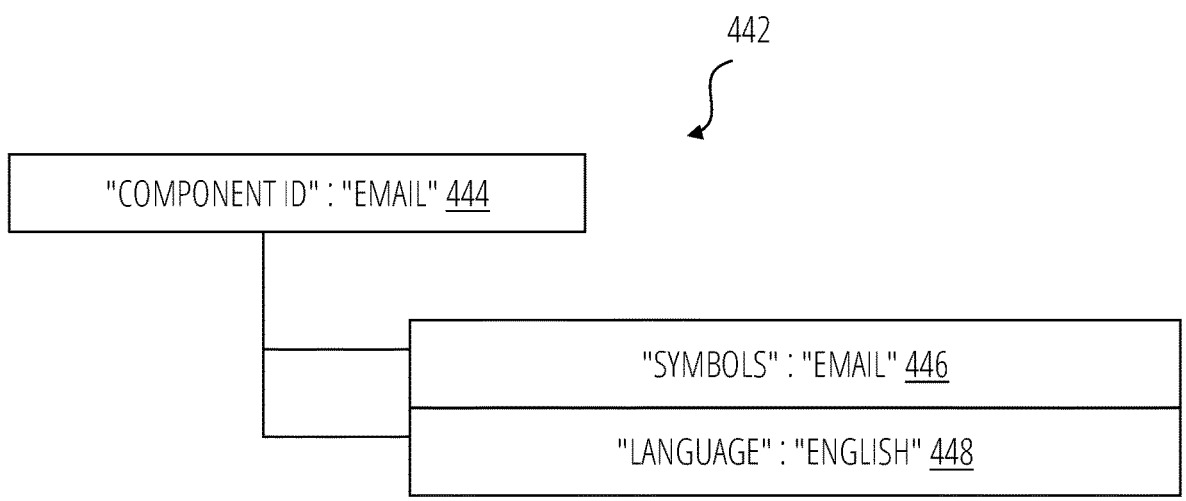
FIG. 4C is an illustration of another data structure in accordance with some examples.

FIG. 4A is collaboration diagram of a hand-tracking input pipeline 430 of an AR system, such as glasses 100, and FIG. 4B and FIG. 4C are illustrations of data structures in accordance with some examples. A camera component 402 generates real-world scene environment frame data 424 of a real-world scene environment from a perspective of a user of the AR system using one or more cameras of the AR system, such as cameras 114 and 116 of FIG. 1. The camera component 402 communicates the real-world scene environment frame data 424 to a skeletal model inference component 404. Included in the real-world scene environment frame data 424 are tracking video frame data of user's hands, and fingers. The tracking video frame data includes video frame data of movement of the user's hands and fingers as the user makes a gesture or moves their hands and fingers to interact with a real-world scene environment; video frame data of locations of the user's makes the gesture or moves their hands and fingers to interact with the real-world scene environment; and video frame data of positions in which the user holds their upper body, arms, hands, and fingers as the user makes the gesture or moves their hands and fingers to interact with the real-world scene environment.

The skeletal model inference component 404 receives the real-world scene environment frame data 424 and generates skeletal model data 428 based on the real-world scene environment frame data 424. In some examples, the skeletal model inference component 404 extracts features of the user's upper body, arms, and hands from the tracking video frame data included in the real-world scene environment frame data 424. The extracted features may include landmark data including landmark identification, location in the real-world scene environment, and categorization information of one or more landmarks associated with the user's upper body, arms, and hands. The skeletal model inference component 404 generates the skeletal model data 428 based on the extracted features and one or more skeletal models previously created using geometric methodologies. In additional examples, the skeletal model inference component 404 generates the skeletal model data on a basis of categorizing the real-world scene environment frame data 424 using artificial intelligence methodologies and one or more skeletal models previously generated using machine learning methodologies.

The hand classifier inference component 406 receives the skeletal model data 428 from the skeletal model inference component 404 and generates hand classifier probability data 426 based on the skeletal model data 428. In some examples, gestures are specified by the hand-tracking input pipeline 430 in terms of combinations of hand classifiers. The hand classifiers are in turn composed of combinations and relationships of landmarks included in the skeletal model data 428. In some examples, the hand classifier inference component 406 compares one or more skeletal models included in skeletal model data 428 to previously generated hand classifier models and generates one or more hand classifier probabilities on a basis of the comparison. The one or more hand classifier probabilities indicate a probability that a specified hand classifier can be identified from the skeletal model data 428. The hand classifier inference component 406 generates hand classifier probability data 426 based on the one or more hand classifier probabilities. In additional examples, the hand classifier inference component 406 determines the one or more hand classifier probabilities on a basis of categorizing the skeletal models using artificial intelligence methodologies and a hand classifier model previously generated using machine learning methodologies.

In some examples, the hand-tracking input pipeline 430 extracts hand classifiers from the skeletal model data 428 by the hand-tracking input pipeline 430 in a layer distinct from assembly of hand movements into gestures. Accordingly, a designer of an AR application component executed by the AR system may create new gestures built out of existing hand classifiers composing already known gestures without having to retrain machine learning components of the hand-tracking input pipeline 430 or generate implementation specific hand classifier models. In some examples, a hand classifier model used to generate hand classifier probability data is not implementation specific. That is, the hand classifier model is not trained to recognize only specific hand classifiers for the purposes of a specific implementation. Instead, the hand classifier model is trained to recognize as many hand classifiers as possible without regard to what those hand classifiers signify in the context of a specific implementation such as a task specific AR application component.

The hand classifier inference component 406 communicates the hand classifier probability data 426 to a gesture inference component 408 and a gesture text input recognition component 410. The gesture inference component 408 receives the hand classifier probability data 426 and determines gesture input event data 422 based on the hand classifier probability data 426. In some examples, the gesture inference component 408 compares hand classifiers identified in the hand classifier probability data 426 to gesture identification data identifying specific gestures. A gesture identification is composed of one or more hand classifiers that correspond to a specific gesture. A gesture identification is defined using a grammar whose symbols correspond to hand classifiers. For example, a gesture identification for gesture 522 of FIG. 5B is "LEFT_PALMAR_FINGERS EXTENDED_RIGHT PALMAR_FINGERS_EXTENDED" where: "LEFT" is a symbol corresponding to a hand classifier indicating that the user's left hand has been detected; "PALMAR" is a symbol corresponding to a hand classifier indicating that a palm of a hand of the user has been detected and modifies "LEFT" to indicate that the user's left hand palm has been detected; "FINGERS" is a symbol corresponding to a hand classifier indicating that the user's fingers have been detected; and "EXTENDED" is a symbol corresponding to a hand classifier indicating that the user's fingers are extended and modifies "FINGERS". In additional examples, a gesture identification is a single token, such as a number, identifying a gesture based on the gesture's component hand classifiers. A gesture identification identifies a gesture in the context of a physical description of the gesture. The gesture inference component 408 communicates the 422 to a system framework component 414.

The gesture text input recognition component 410 receives the hand classifier probability data 426 and generates symbol input event data 412 based on the hand classifier probability data 426. In some examples, the gesture inference component 408 compares hand classifiers identified in the hand classifier probability data 426 to symbol data identifying specific characters, words, and commands. For example, symbol data for gesture 526 is the character "V" as gesture 526 that is a fingerspelling sign in American Sign Language (ASL). The individual hand classifiers for "V" fingerspelling sign 526 may be "LEFT" for left hand, "PALMAR" for the palm of the left hand, "INDEXFINGER" for the index finger "EXTENDED" modifying "INDEXFINGER", "MIDDLEFINGER" for the middle finger, "EXTENDED" modifying "MIDDLEFINGER", "RINGFINGER" for the ring finger, "CURLED" modifying "RINGFINGER", "LITTLEFINGER" for the little finger, "CURLED" modifying "LITTLEFINGER", "THUMB" for the thumb and "CURLED" modifying "THUMB".

In some examples, entire words may also be identified by the gesture text input recognition component 410 based on hand classifiers indicated by the hand classifier probability data 426. In additional embodiments, a command, such as command corresponding to a specified set of keystrokes in an input system having a keyboard, may be identified by the gesture text input recognition component 410 based on hand classifiers indicated by the hand classifier probability data 426.

The gesture inference component 408 and the gesture text input recognition component 410 communicate the gesture input event data 422 and symbol input event data 412, respectively, to a system framework component 414. The system framework component 414 receives the gesture input event data 422 and the symbol input event data 412 (collectively and separately "input event data") and classifies the gesture input event data 422 and the symbol input event data 412 as undirected input event data 450 or directed input event data 452 based in part on the input event data. Undirected input events belong to an undirected class of input events and the system framework component 414 routes the undirected input event data 450 to operating system level components, such as a system user interface component 416 based on the classification of the undirected input event data 450. Directed input events belong to a directed class of input events and the system framework component 414 routes the directed input event data 452 to a target component, such as an AR gesture application component 418, on a basis of classification of the directed input event data 452.

In an example of classifying and routing input event data received from the gesture inference component 408 and the gesture text input recognition component 410, the system framework component 414 classifies the input event data as undirected input event data 450 based on the input event data and component registration data described below. The system framework component 414 receives the input event data and determines an AR application component as a target AR application component based on a user's 456 indication or selection of a virtual object 454 associated with a target AR gesture application component 418 while making a gesture corresponding to the input event data. The system framework component 414 determines a location in the real-world scene environment of the user's hand while making the gesture based on skeletal model data 428. The system framework component 414 determines a set of virtual objects that are currently being provided by the AR system to the user in an AR experience. The system framework component 414 determines a virtual object whose apparent location in a real-world scene environment correlates to a location in the real-world scene environment of the user's 456 hand while making the gesture. The system framework component 414 determines the target AR gesture application component, such as AR gesture application component 418, on a basis of looking up, in internal data structures of the AR system, an AR gesture application component to which the virtual object, such as virtual object 454, is associated and determines that AR application component, such as AR gesture application component 418, as the target AR application component.

In some examples, the system framework component 414 registers the target AR application component to which the directed input event data 452 is to be routed by storing component registration data, such as component registration data 440 of FIG. 4B, in a datastore to be accessed during operation of the system framework component 414. The component registration data 440 includes a component ID field 432 identifying a target AR application component, a registered language field 438 identifying a language model to be associated with the target AR application component, and one or more registered gesture fields 434 and/or registered symbols fields 436 indicating gestures and symbols that are to be routed to the registered AR application component. As illustrated, the component ID field 432 includes an AR application component identification "TEXT ENTRY"; the registered language field 438 identifies a language associated with the registered AR application component, namely "ENGLISH"; the registered gesture field 434 includes a gesture identification, namely "LEFT_PALMAR_FINGERS EXTENDED_RIGHT_PALMAR_FINGERS_EXTENDED", that should be routed to the registered target AR application component, and registered symbols field 436 identifying a set of symbols, namely "[*]" signifying all symbols, that should be routed to the registered AR application component.

As another example of component registration data, component registration data 442 of FIG. 4C includes a component ID field 444 including an AR application component identification "EMAIL"; a registered language field 438 identifying a language associated with the registered AR application component, namely "ENGLISH", and registered symbol field 446 identifying a set of symbols, namely the word "EMAIL", that should be routed to the registered AR application component.

Referring again to the system framework component 414 processing input event data received from the gesture inference component 408 and the gesture text input recognition component 410, the system framework component 414 classifies input event data received from the gesture inference component 408 and the gesture text input recognition component 410 as either undirected input event data 450 or directed input event data 452 based on the input event data and component registration data. In some examples, when processing symbol input event data 412 included in the input event data, the system framework component 414 searches registered symbols fields of the component registration data, such as registered symbols field 436 of component registration data 440, for registered symbols that match the symbol input event data. When the system framework component 414 determines a match, the system framework component 414 classifies the symbol input event data as directed input event data 452. The system framework component 414 also determines a target AR application component based on a target AR application component identified in a component ID field, such as component ID field 432, of the component registration data including the matched registered symbols.

In a similar manner, when processing gesture input event data 422 included in the input event data, the system framework component 414 searches the registered gesture fields of the component registration data, such as registered gesture field 434 of component registration data 440, for registered gestures that match the gesture input event data. When the system framework component 414 determines a match, the system framework component 414 classifies the gesture input event data as directed input event data 452 and also determines a target AR application component to which the directed input event data 452 is to be routed. In a case the system framework component 414 determines that the symbol input event data and/or the gesture input event data of the input event data are not found in the component registration data, the 414 determines that the input event data are to be classified as undirected input event data 450 and are to be routed to the system user interface component 416.

In another example of processing directed input event data 452, an AR application component, such as the AR gesture application component 418, registers itself with the system framework component 414. To do so, the AR application component communicates component registration data, such as component registration data 440 of FIG. 4B, to the system framework component 414. The system framework component 414 receives the component registration data and stores the component registration data in a datastore for use in routing directed input event data 452 to the AR application component.

In another example, the system framework component 414 classifies the input event data as directed input event data 452 and determines a target AR application component based on an execution context of an AR application component. For example, if the AR system is executing a current AR application component in a single-application modal state, the current AR application component is implied as the target AR application component to which the directed input event data 452 should be routed. The system framework component 414 determines the target AR application component and classifies the input event data as directed input event data 452 based on the implication and routes the directed input event data 452 to the target AR application component.

In some examples, the system framework component 414 communicates language model feedback data 420 to the hand classifier inference component 406 and the gesture inference component 408 in order to improve the accuracy of the inferences made by the hand classifier inference component 406 and gesture inference component 408. In some examples, the system framework component 414 generates the language model feedback data 420 based on user context data such as component registration data of the registered AR application components and data about hand classifiers composing the registered gestures and hand classifiers composing gestures associated with registered symbols. The component registration data includes information of gestures and symbols in the gesture input event data 422 and symbol input event data 412 routed to the AR application component as part of directed input event data 452, as well as a language associated with the AR application component. In addition, the system framework component 414 includes information about compositions of specific gestures including hand classifiers that are associated with the gestures and symbols.

In another example of processing language model feedback data 420, the system framework component 414 communicates hints as part of the language model feedback data 420 to the hand classifier inference component 406, gesture inference component 408, and gesture text input recognition component 410. The system framework component 414 generates the hints based on a language model associated with an AR application component, such as by a language specified in the registered language field 448 in component registration data 442. The gesture text input recognition component 410 determines a probable next symbol N based on previous characters N−1, N−2, etc. and the language model. In some examples, the system framework component 414 generates the hints based on a language model that is a hidden Markov model predicting what the next symbol N should be based on one or more of the previous characters N−1, N−2, etc. In another example, the gesture text input recognition component 410 uses AI methodologies to generate the next symbol N based on a language model that is generated using machine learning methodologies. The system framework component 414 generates the hints based on the next symbol N. In some examples, the system framework component 414 determines a next gesture associated with the next symbol N by mapping the next symbol N to a next gesture based on a lookup table associating symbols with gestures. The system framework component 414 decomposes the next gesture to a set of one or more next hand classifiers. The system framework component 414 communicates the next gesture to the gesture inference component 408 as part of language model feedback data 420 and communicates the set of next hand classifiers to the hand classifier inference component 406 as part of language model feedback data 420.

AR application components executed by the AR system, such as system user interface component 416, and AR gesture application component 418, are consumers of the data generated by the hand-tracking input pipeline 430, such as gesture input event data 422, and symbol input event data 412. The AR system executes the system user interface component 416 to provide a system-level user interface to the user of the AR system, such as a command console or the like, utilizing gestures as an input modality. The AR system executes the AR gesture application component 418 to provide a user interface to a user of the AR system, such as an AR experience, utilizing gestures as an input modality.

The system framework component 414, on a basis of classifying that the input event data as undirected input event data 450, routes the input event data as undirected input event data 450 to the system user interface component 416.

In many examples, the hand classifier inference component 406, the gesture inference component 408, and gesture text input recognition component 410 communicate the hand classifier probability data 426, the gesture input event data 422, and the symbol input event data 412, respectively, via inter process communication (IPC) methodologies.

In some examples, the hand-tracking input pipeline 430 continuously generates and publishes symbol input event data 412 and gesture input event data 422 based on the real-world scene environment frame data 424 generated by the one or more cameras of the AR system.

Figure 5A:
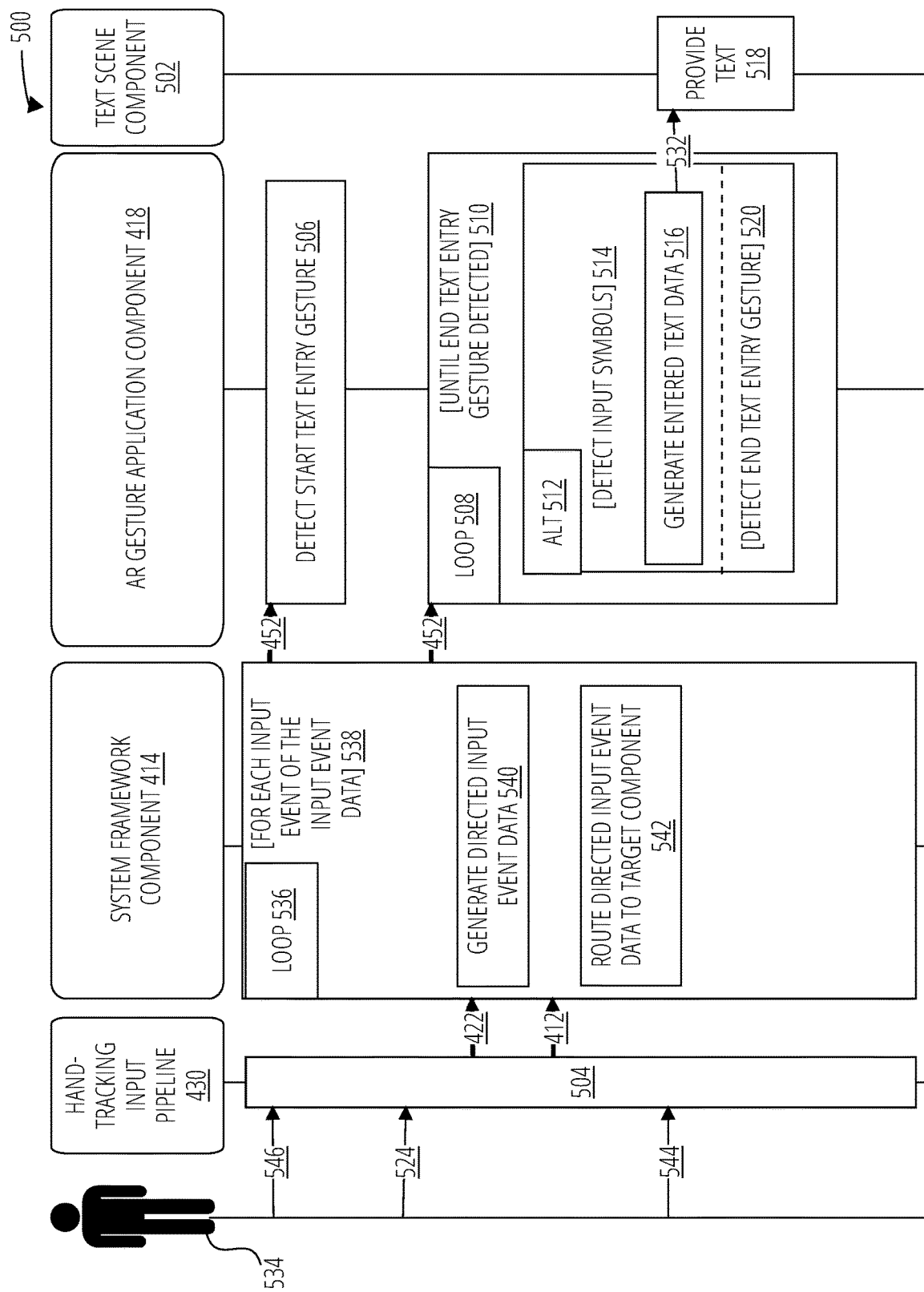
FIG. 5A is a sequence diagram of a fingerspelling text entry process of an AR system in accordance with some examples.
Figure 5B:
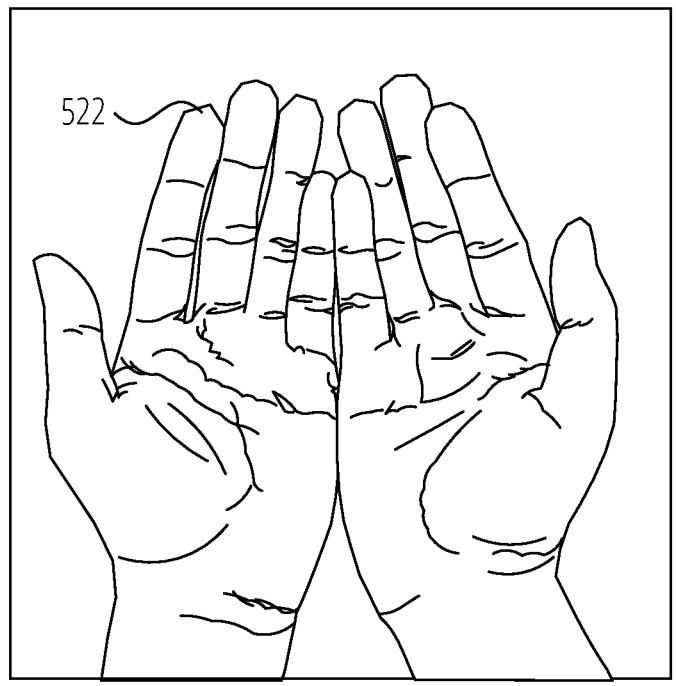
FIG. 5B is an illustration of a start/stop text entry gesture in accordance with some examples.
Figure 5C:
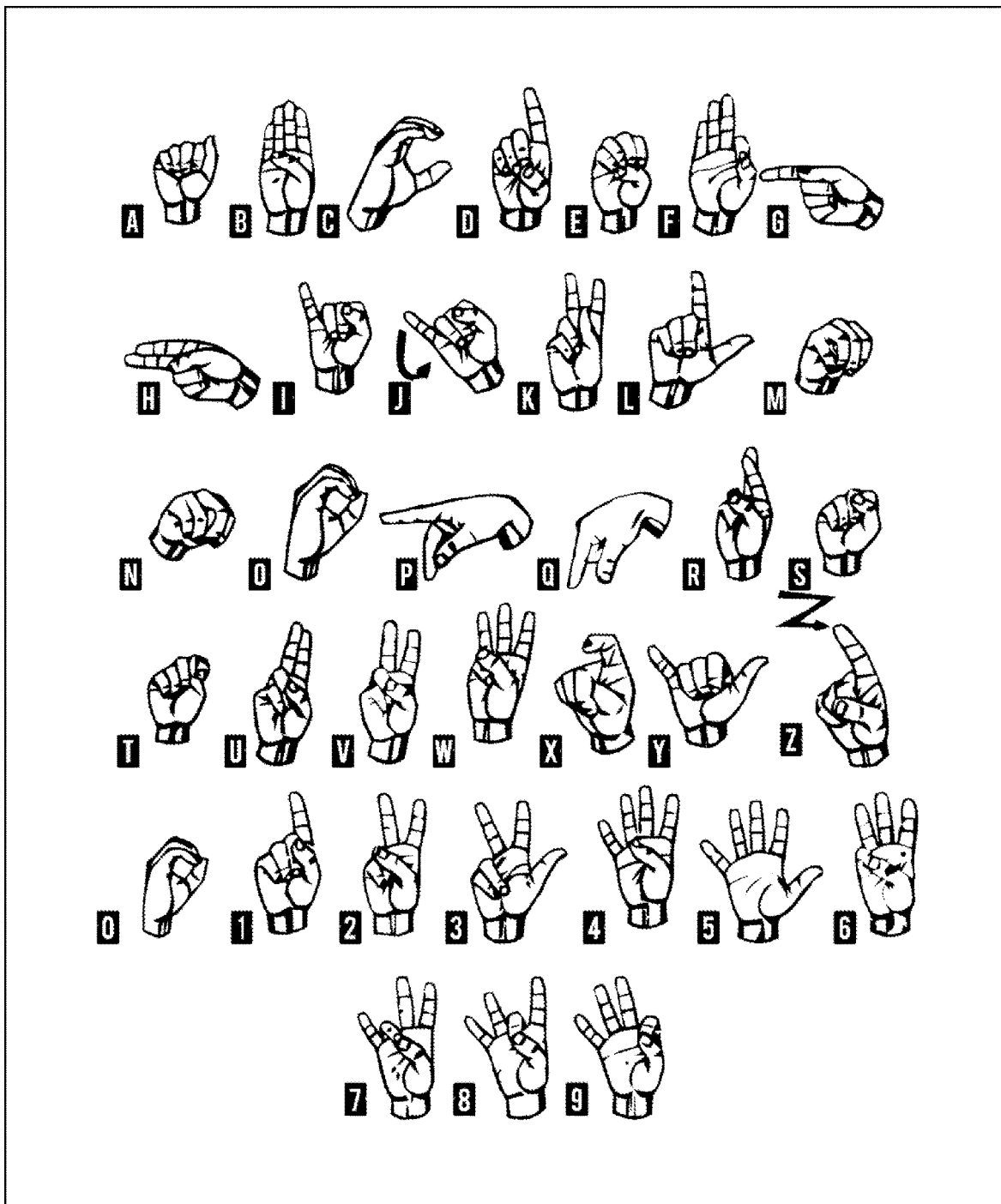
FIG. 5C is an illustration of fingerspelling signs in accordance with some examples.
Figure 5D:
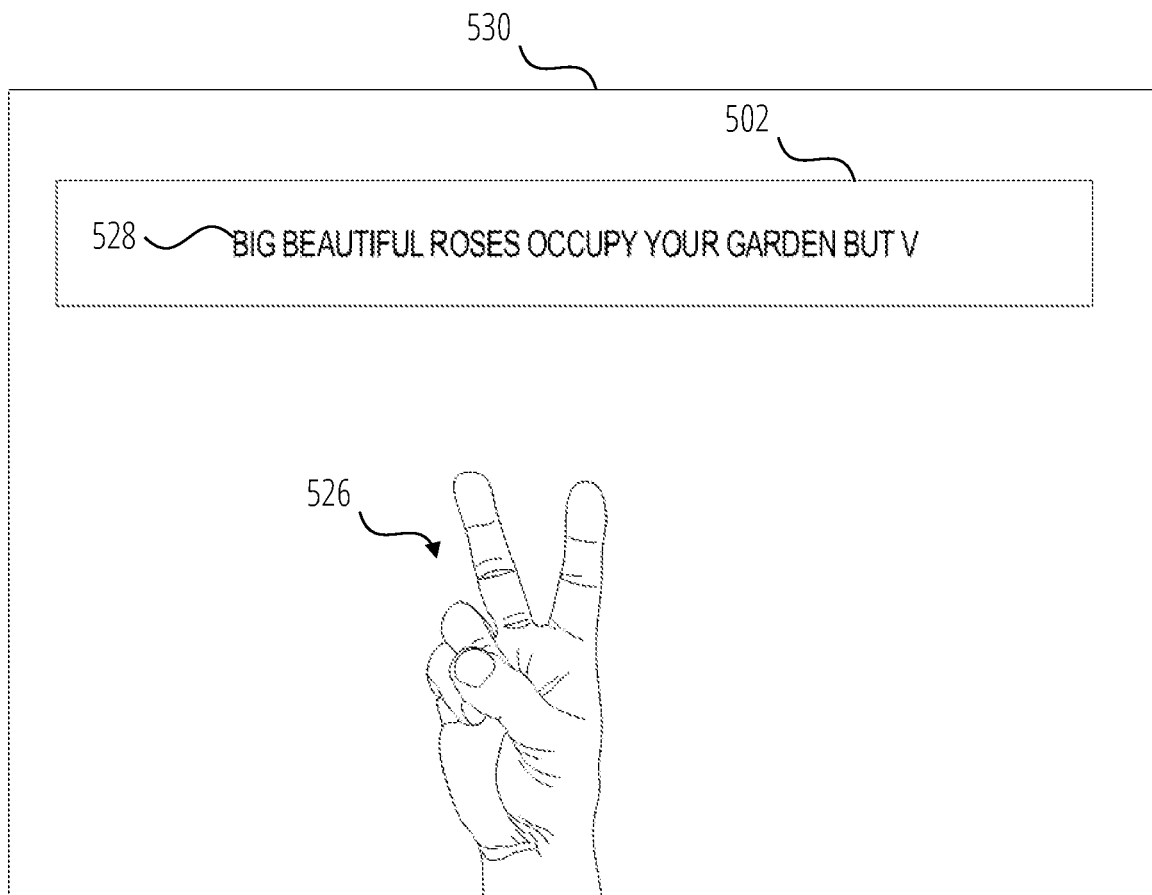
FIG. 5D is an illustration of an AR overlay in accordance with some examples.

FIG. 5A is a sequence diagram of a fingerspelling text entry process 500 of an AR system, such as glasses 100, FIG. 5B is an illustration of a start/end text entry gesture 522, FIG. 5C is an illustration of fingerspelling signs 524, and FIG. 5D is an illustration of an AR overlay 530 in accordance with some examples. During the fingerspelling text entry process 500, the AR system utilizes an AR gesture application component 418 to implement the fingerspelling text entry process 500 using gesture recognition methodologies.

The AR system utilizes a hand-tracking input pipeline 430 to supply AR gesture application component 418 with symbol input event data 412 and gesture input event data 422 as part of directed input event data 452. A gesture text input recognition component 410 of FIG. 4A generates the symbol input event data 412 based on a fingerspelling model and hand classifier probability data 426. In some examples, the gesture text input recognition component 410 classifies the hand classifier probability data 426 and assigns the hand classifier probability data 426 to fingerspelling signs, such as the fingerspelling signs 524 of FIG. 5C, that correspond to letters or characters in an alphabet and numerals, using AI methodologies and a fingerspelling model generated using machine learning methodologies. The gesture text input recognition component 410 generates the symbol input event data 412 based on the fingerspelling signs by mapping the fingerspelling signs to respective characters in the alphabet or numerals.

In another example, the gesture text input recognition component 410 compares the hand classifier probability data 426 to a previously determined set of fingerspelling models where a member fingerspelling model of the set of fingerspelling models corresponds to an individual fingerspelling sign. The gesture text input recognition component 410 selects a fingerspelling sign corresponding to the hand classifier probability data 426 based on the comparison and generates the symbol input event data 412 based on the fingerspelling signs by mapping the fingerspelling signs to respective characters in the alphabet or numerals.

In some examples, additional gestures and signs (not shown) are made by the user 534 to indicate text editing commands. The user 534 uses these to commands instruct the AR system to perform editing functions on entered text.

During use of the AR system by user 534, when the user 534 wants to enter text into a virtual object, such as text scene component 502, of an AR gesture application component, such as AR gesture application component 418, the user 534 creates an input event by making start text entry gesture 546, such as start/end text entry gesture 522. In operation 504, the hand-tracking input pipeline 430 generates gesture input event data 422 based on real-world scene environment video frame data of the start text entry gesture 546 being made by the user 534 as described herein. The hand-tracking input pipeline 430 communicates the gesture input event data 422 to a system framework component 414.

In loop operation 536, the system framework component 414 receives and processes each input event included in the gesture input event data 422 and the symbol input event data 412 received from the hand-tracking input pipeline 430 as indicated by guard condition 538. In operation 540, the system framework component 414 generates directed input event data 452 based on the gesture input event data 422 and component registration data, such as component registration data 440 of FIG. 4B, as described herein. In operation 542, the system framework component 414 routes the directed input event data 452 to the AR gesture application component 418.

In operation 506, the AR gesture application component 418 receives the directed input event data 452 including the gesture input event data 422 of the start text entry gesture 546 being made by the user 534 and detects that the start text entry gesture 546 is being made by the user 534 based on the directed input event data 452. On a basis of detecting the start text entry gesture 546, the AR gesture application component 418 starts text entry into the text scene component 502.

The user 534 makes one or more fingerspelling signs 524 and in operation 504, the hand-tracking input pipeline 430 generates symbol input event data 412 of the fingerspelling signs 524 based on real-world scene environment video frame data generated by the one or more cameras as described herein. The hand-tracking input pipeline 430 communicates the symbol input event data 412 to the system framework component 414.

In operation 540 of loop operations 536, the system framework component 414 generates directed input event data 452 based on the symbol input event data 412 and component registration data as described herein. In operation 542, the system framework component 414 routes the directed input event data 452 including the symbol input event data 412 to the AR gesture application component 418.

In loop operation 508, the AR gesture application component 418 executes loop operation 508 until the AR gesture application component 418 detects an end text entry gesture 544 being made by the user, such as start/end text entry gesture 522, as indicated by guard condition 510.

In alternative operation 512 the AR gesture application component 418 receives the directed input event data 452 and detects one or more input symbols of the symbol input event data 412 in the directed input event data 452, as indicated by guard condition 514. The one more input symbols correspond to the one or more fingerspelling signs 524 being made by the user 534. The one or more input symbols include characters corresponding to letters in an alphabet, numerals and editing commands. On a basis of detecting the input symbols, in operation 516, the AR gesture application component 418 generates entered text data 532 based on the one more input symbols and communicates the entered text data 532 to the text scene component 502. In operation 518, the text scene component 502 provides entered text 528 to the user in the text scene component 502 based on the entered text data 532.

In some examples, the one or more input symbols correspond to one or more editing commands for text being entered by the user 534. On a basis of determining that the one or more input symbols correspond to one or more editing commands, the AR gesture application component 418 performs one or more editing functions on the entered text 528, such as a cut operation, copy operation, paste operation, etc.

When the user 534 is finished entering text into the text scene component 502, the user 534 makes an end text entry gesture 544, such as start/end text entry gesture 522. In operation 504, the hand-tracking input pipeline 430 generates gesture input event data 422 based on real-world scene environment video frame data of the end text entry gesture 544 being made by the user 534 as described herein. The hand-tracking input pipeline 430 communicates the gesture input event data 422 to the system framework component 414.

In operation 540, the system framework component 414 generates directed input event data 452 including the gesture input event data 422 based on the gesture input event data 422 and the component registration data as described herein. In operation 542, the system framework component 414 routes the directed input event data 452 to the AR gesture application component 418.

In loop operation 508, the AR gesture application component 418 receives the directed input event data 452. In alternative operation 512 the AR system detects the end text entry gesture 544 being made by the user 534 based on the gesture input event data 422 of the directed input event data 452, as indicated by guard condition 520. On a basis of detecting the end text entry gesture 544, the AR gesture application component 418 terminates the fingerspelling text entry process 500.

In some examples, the AR gesture application component 418 of the AR system performs the functions of the hand-tracking input pipeline 430 and the system framework component 414 by utilizing various APIs and system libraries of the AR system.

Figure 6:
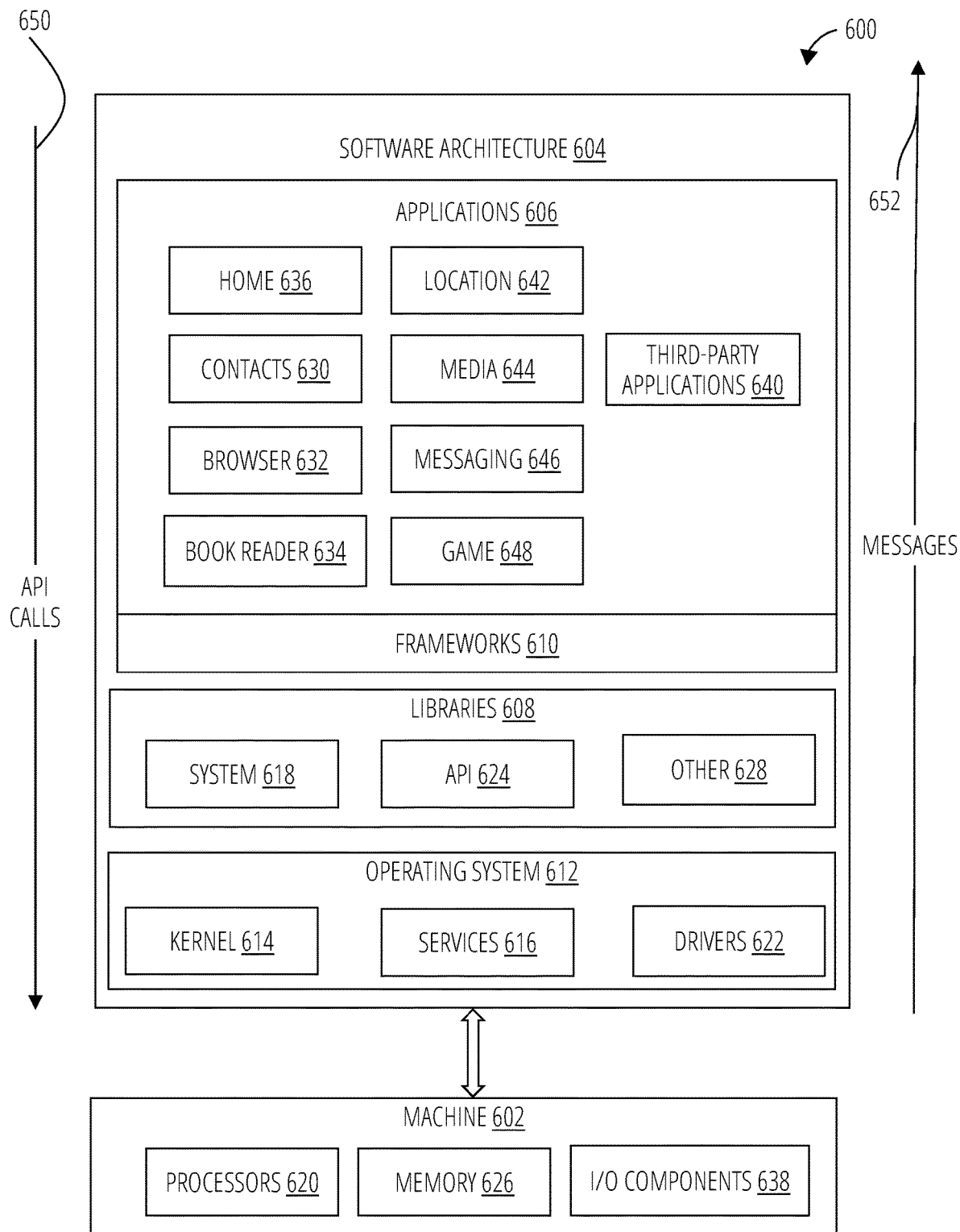
FIG. 6 is a block diagram showing a software architecture within which the present disclosure may be implemented, in accordance with some examples.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where individual layers provide a particular functionality. The software architecture 604 includes layers such as an operating system 612, libraries 608, frameworks 610, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionalities. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 608 provide a low-level common infrastructure used by the applications 606. The libraries 608 can include system libraries 618 (e.g., C standard library) that provide functions such as memory allocation functions, string manipulation functions, mathematic functions, and the like. In addition, the libraries 608 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g., OpenIMAJ), database libraries (e.g., SQLite to provide various relational database functions), web libraries (e.g., WebKit to provide web browsing functionality), and the like. The libraries 608 can also include a wide variety of other libraries 628 to provide many other APIs to the applications 606.

The frameworks 610 provide a high-level common infrastructure that is used by the applications 606. For example, the frameworks 610 provide various graphical user interface (GUI) functions, high-level resource management, and high-level location services. The frameworks 610 can provide a broad spectrum of other APIs that can be used by the applications 606, some of which may be specific to a particular operating system or platform.

In some examples, the applications 606 may include a home application 636, a contacts application 630, a browser application 632, a book reader application 634, a location application 642, a media application 644, a messaging application 646, a game application 648, and a broad assortment of other applications such as third-party applications 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party applications 640 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 640 can invoke the API calls 650 provided by the operating system 612 to facilitate functionality described herein.

Figure 7:
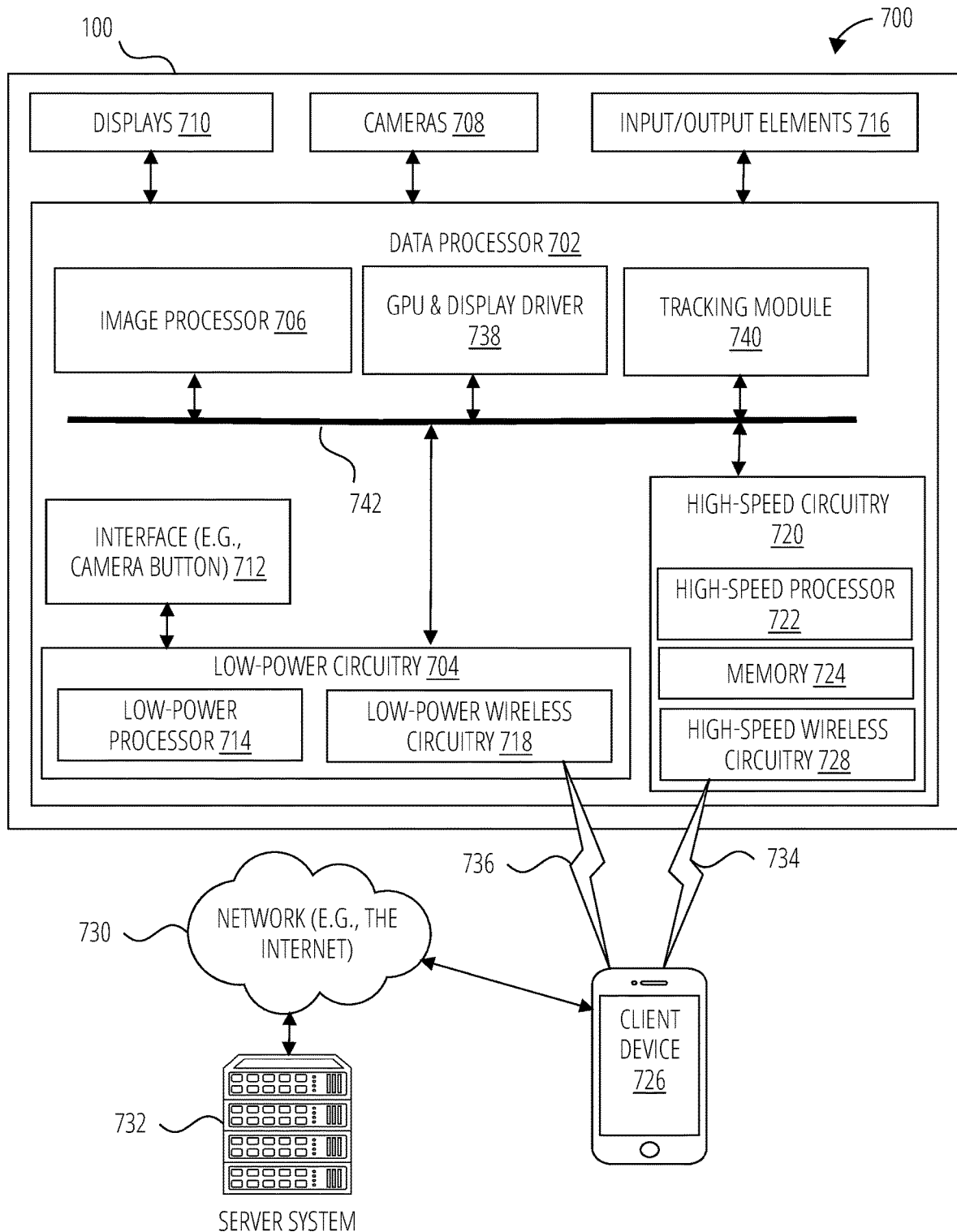
FIG. 7 is a block diagram illustrating a networked system including details of a head-worn AR system, in accordance with some examples.

FIG. 7 is a block diagram illustrating a networked system 700 including details of the glasses 100, in accordance with some examples. The networked system 700 includes the glasses 100, a client device 726, and a server system 732. The client device 726 may be a smartphone, tablet, phablet, laptop computer, access point, or any other such device capable of connecting with the glasses 100 using a low-power wireless connection 736 and/or a high-speed wireless connection 734. The client device 726 is connected to the server system 732 via the network 730. The network 730 may include any combination of wired and wireless connections. The server system 732 may be one or more computing devices as part of a service or network computing system. The client device 726 and any elements of the server system 732 and network 730 may be implemented using details of the software architecture 604 or the machine 300 described in FIG. 6 and FIG. 3 respectively.

The glasses 100 include a data processor 702, displays 710, one or more cameras 708, and additional input/output elements 716. The input/output elements 716 may include microphones, audio speakers, biometric sensors, additional sensors, or additional display elements integrated with the data processor 702. Examples of the input/output elements 716 are discussed further with respect to FIG. 6 and FIG. 3. For example, the input/output elements 716 may include any of I/O components 306 including output components 328, motion components 336, and so forth. Examples of the displays 710 are discussed in FIG. 2. In the particular examples described herein, the displays 710 include a display for the user's left and right eyes.

The data processor 702 includes an image processor 706 (e.g., a video processor), a GPU & display driver 738, a tracking module 740, an interface 712, low-power circuitry 704, and high-speed circuitry 720. The components of the data processor 702 are interconnected by a bus 742.

The interface 712 refers to any source of a user command that is provided to the data processor 702. In one or more examples, the interface 712 is a physical button that, when depressed, sends a user input signal from the interface 712 to a low-power processor 714. A depression of such button followed by an immediate release may be processed by the low-power processor 714 as a request to capture a single image, or vice versa. A depression of such a button for a first period of time may be processed by the low-power processor 714 as a request to capture video data while the button is depressed, and to cease video capture when the button is released, with the video captured while the button was depressed stored as a single video file. Alternatively, depression of a button for an extended period of time may capture a still image. In some examples, the interface 712 may be any mechanical switch or physical interface capable of accepting user inputs associated with a request for data from the cameras 708. In other examples, the interface 712 may have a software component, or may be associated with a command received wirelessly from another source, such as from the client device 726.

The image processor 706 includes circuitry to receive signals from the cameras 708 and process those signals from the cameras 708 into a format suitable for storage in the memory 724 or for transmission to the client device 726. In one or more examples, the image processor 706 (e.g., video processor) comprises a microprocessor integrated circuit (IC) customized for processing sensor data from the cameras 708, along with volatile memory used by the microprocessor in operation.

The low-power circuitry 704 includes the low-power processor 714 and the low-power wireless circuitry 718. These elements of the low-power circuitry 704 may be implemented as separate elements or may be implemented on a single IC as part of a system on a single chip. The low-power processor 714 includes logic for managing the other elements of the glasses 100. As described above, for example, the low-power processor 714 may accept user input signals from the interface 712. The low-power processor 714 may also be configured to receive input signals or instruction communications from the client device 726 via the low-power wireless connection 736. The low-power wireless circuitry 718 includes circuit elements for implementing a low-power wireless communication system. Bluetooth™ Smart, also known as Bluetooth™ low energy, is one standard implementation of a low power wireless communication system that may be used to implement the low-power wireless circuitry 718. In other examples, other low power communication systems may be used.

The high-speed circuitry 720 includes a high-speed processor 722, a memory 724, and a high-speed wireless circuitry 728. The high-speed processor 722 may be any processor capable of managing high-speed communications and operation of any general computing system used for the data processor 702. The high-speed processor 722 includes processing resources used for managing high-speed data transfers on the high-speed wireless connection 734 using the high-speed wireless circuitry 728. In some examples, the high-speed processor 722 executes an operating system such as a LINUX operating system or other such operating system such as the operating system 612 of FIG. 6. In addition to any other responsibilities, the high-speed processor 722 executing a software architecture for the data processor 702 is used to manage data transfers with the high-speed wireless circuitry 728. In some examples, the high-speed wireless circuitry 728 is configured to implement Institute of Electrical and Electronic Engineers (IEEE) 802.11 communication standards, also referred to herein as Wi-Fi. In other examples, other high-speed communications standards may be implemented by the high-speed wireless circuitry 728.

The memory 724 includes any storage device capable of storing camera data generated by the cameras 708 and the image processor 706. While the memory 724 is shown as integrated with the high-speed circuitry 720, in other examples, the memory 724 may be an independent stand-alone element of the data processor 702. In some such examples, electrical routing lines may provide a connection through a chip that includes the high-speed processor 722 from image processor 706 or the low-power processor 714 to the memory 724. In other examples, the high-speed processor 722 may manage addressing of the memory 724 such that the low-power processor 714 will boot the high-speed processor 722 any time that a read or write operation involving the memory 724 is desired.

The tracking module 740 estimates a pose of the glasses 100. For example, the tracking module 740 uses image data and associated inertial data from the cameras 708 and the position components 340, as well as GPS data, to track a location and determine a pose of the glasses 100 relative to a frame of reference (e.g., real-world scene environment). The tracking module 740 continually gathers and uses updated sensor data describing movements of the glasses 100 to determine updated three-dimensional poses of the glasses 100 that indicate changes in the relative position and orientation relative to physical objects in the real-world scene environment. The tracking module 740 permits visual placement of virtual objects relative to physical objects by the glasses 100 within the field of view of the user via the displays 710.

The GPU & display driver 738 may use the pose of the glasses 100 to generate frames of virtual content or other content to be presented on the displays 710 when the glasses 100 are functioning in a traditional augmented reality mode. In this mode, the GPU & display driver 738 generates updated frames of virtual content based on updated three-dimensional poses of the glasses 100, which reflect changes in the position and orientation of the user in relation to physical objects in the user's real-world scene environment.

One or more functions or operations described herein may also be performed in an application resident on the glasses 100 or on the client device 726, or on a remote server. For example, one or more functions or operations described herein may be performed by one of the applications 606 such as messaging application 646.

Figure 8:
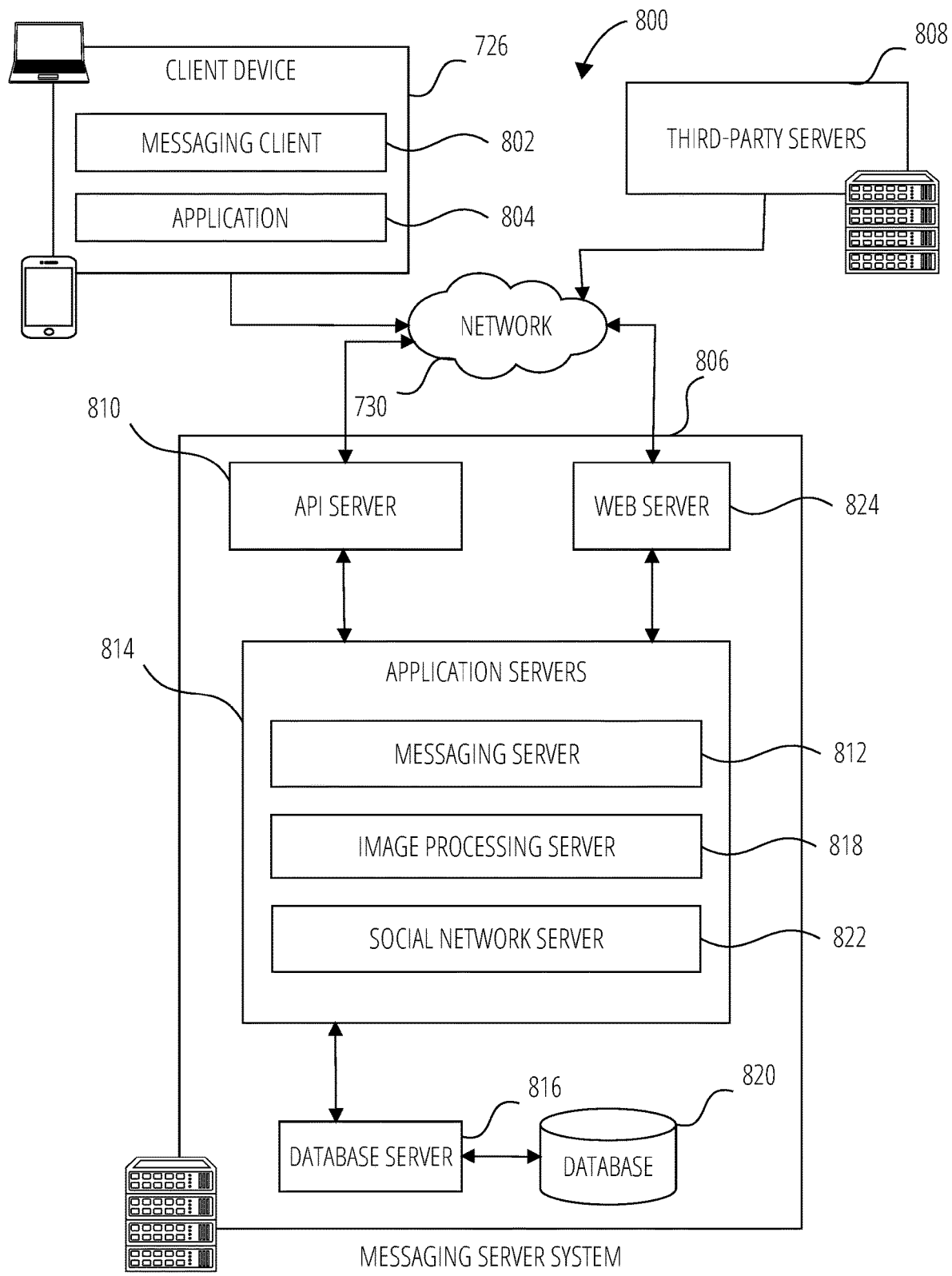
FIG. 8 is a block diagram showing an example messaging system for exchanging data (e.g., messages and associated content) over a network in accordance with some examples

FIG. 8 is a block diagram showing an example messaging system 800 for exchanging data (e.g., messages and associated content) over a network. The messaging system 800 includes multiple instances of a client device 726 which host a number of applications, including a messaging client 802 and other applications 804. A messaging client 802 is communicatively coupled to other instances of the messaging client 802 (e.g., hosted on respective other client devices 726), a messaging server system 806 and third-party servers 808 via a network 730 (e.g., the Internet). A messaging client 802 can also communicate with locally-hosted applications 804 using Application Program Interfaces (APIs).

A messaging client 802 is able to communicate and exchange data with other messaging clients 802 and with the messaging server system 806 via the network 730. The data exchanged between messaging clients 802, and between a messaging client 802 and the messaging server system 806, includes functions (e.g., commands to invoke functions) as well as payload data (e.g., text, audio, video or other multimedia data).

The messaging server system 806 provides server-side functionality via the network 730 to a particular messaging client 802. While some functions of the messaging system 800 are described herein as being performed by either a messaging client 802 or by the messaging server system 806, the location of some functionality either within the messaging client 802 or the messaging server system 806 may be a design choice. For example, it may be technically preferable to initially deploy some technology and functionality within the messaging server system 806 but to later migrate this technology and functionality to the messaging client 802 where a client device 726 has sufficient processing capacity.

The messaging server system 806 supports various services and operations that are provided to the messaging client 802. Such operations include transmitting data to, receiving data from, and processing data generated by the messaging client 802. This data may include message content, client device information, geolocation information, media augmentation and overlays, message content persistence conditions, social network information, and live event information, as examples. Data exchanges within the messaging system 800 are invoked and controlled through functions available via user interfaces (UIs) of the messaging client 802.

Turning now specifically to the messaging server system 806, an Application Program Interface (API) server 810 is coupled to, and provides a programmatic interface to, application servers 814. The application servers 814 are communicatively coupled to a database server 816, which facilitates access to a database 820 that stores data associated with messages processed by the application servers 814. Similarly, a web server 824 is coupled to the application servers 814, and provides web-based interfaces to the application servers 814. To this end, the web server 824 processes incoming network requests over the Hypertext Transfer Protocol (HTTP) and several other related protocols.

The Application Program Interface (API) server 810 receives and transmits message data (e.g., commands and message payloads) between the client device 726 and the application servers 814. Specifically, the Application Program Interface (API) server 810 provides a set of interfaces (e.g., routines and protocols) that can be called or queried by the messaging client 802 in order to invoke functionality of the application servers 814. The Application Program Interface (API) server 810 exposes various functions supported by the application servers 814, including account registration, login functionality, the sending of messages, via the application servers 814, from a particular messaging client 802 to another messaging client 802, the sending of media files (e.g., images or video) from a messaging client 802 to a messaging server 812, and for possible access by another messaging client 802, the settings of a collection of media data (e.g., story), the retrieval of a list of friends of a user of a client device 726, the retrieval of such collections, the retrieval of messages and content, the addition and deletion of entities (e.g., friends) to an entity graph (e.g., a social graph), the location of friends within a social graph, and opening an application event (e.g., relating to the messaging client 802).

The application servers 814 host a number of server applications and subsystems, including for example a messaging server 812, an image processing server 818, and a social network server 822. The messaging server 812 implements a number of message processing technologies and functions, particularly related to the aggregation and other processing of content (e.g., textual and multimedia content) included in messages received from multiple instances of the messaging client 802. As will be described in further detail, the text and media content from multiple sources may be aggregated into collections of content (e.g., called stories or galleries). These collections are then made available to the messaging client 802. Other processor and memory intensive processing of data may also be performed server-side by the messaging server 812, in view of the hardware requirements for such processing.

The application servers 814 also include an image processing server 818 that is dedicated to performing various image processing operations, typically with respect to images or video within the payload of a message sent from or received at the messaging server 812.

The social network server 822 supports various social networking functions and services and makes these functions and services available to the messaging server 812. To this end, the social network server 822 maintains and accesses an entity graph within the database 820. Examples of functions and services supported by the social network server 822 include the identification of other users of the messaging system 800 with which a particular user has relationships or is "following," and also the identification of other entities and interests of a particular user.

The messaging client 802 can notify a user of the client device 726, or other users related to such a user (e.g., "friends"), of activity taking place in shared or shareable sessions. For example, the messaging client 802 can provide participants in a conversation (e.g., a chat session) in the messaging client 802 with notifications relating to the current or recent use of a game by one or more members of a group of users. One or more users can be invited to join in an active session or to launch a new session. In some examples, shared sessions can provide a shared augmented reality experience in which multiple people can collaborate or participate.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an application specific integrated circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being an example of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computer-implemented method of a text entry process, the method comprising:
   providing, by an Augmented Reality (AR) system, to a user of the AR system, a text scene component in a user interface, the text scene component having an apparent location in a real-world scene environment, the text scene component associated with an AR application component;
   determining, by one or more processors, a language model based on component registration data of the AR application component, the component registration data including a component ID field identifying the AR application component, a language field identifying the language model, and one or more symbol fields indicating respective one or more symbols to be routed to the AR application component;
   detecting, by the one or more processors, using one or more cameras of the AR system and the language model, a start text entry gesture being made by a user of the AR system;
   determining, by the one or more processors, that the apparent location of the text scene component is correlated to a location in the real-world scene environment of a hand of the user while the user is making the start text entry gesture;
   detecting, by the one or more processors, using the one or more cameras and the language model, one or more input symbols corresponding to fingerspelling signs being made by the user;
   routing, by the one or more processors, the one or more input symbols to the AR application component using the one or more input symbols and the one or more symbol fields of the component registration data;
   generating, by the one or more processors, entered text data based on the one or more input symbols; and
   providing, by the one or more processors, text in the text scene component based on the entered text data.

2. The computer-implemented method of the text entry process of claim 1, further comprising:
   detecting, by the one or more processors, using the one or more cameras of the AR system, an end text entry gesture made by the user; and
   terminating, by the one or more processors, on a basis of the detecting of the end text entry gesture, the text entry process.

3. The computer-implemented method of the text entry process of claim 2, wherein the start text entry gesture and the end text entry gesture are a same gesture.

4. The computer-implemented method of the text entry process of claim 1, wherein the language model comprises a hidden Markov model trained on a corpus of text related to a context of the text scene component.

5. The computer-implemented method of the text entry process of claim 1, wherein routing the entered text data to the AR application component further comprises:
   classifying symbol input event data of the one or more input symbols as directed input event data based on the symbol input event data and the component registration data.

6. The computer-implemented method of the text entry process of claim 1,
   wherein the one or more input symbols include one or more editing commands, and
   wherein generating the entered text data based on the one or more input symbols further includes performing an editing function on the entered text data.

7. The computer-implemented method of the text entry process of claim 1, wherein the AR system comprises a head-worn device.

8. A computing apparatus comprising:
one or more processors; and
a memory storing instructions that, when executed by the one or more processors, cause the computing apparatus to perform operations of a text entry process, the operations comprising:
providing, by an AR system, to a user of the AR system, a text scene component in a user interface, the text scene component having an apparent location in a real-world scene environment, the text scene component associated with an AR application component;
determining a language model based on component registration data of the AR application component, the component registration data including a component ID field identifying the AR application component, a language field identifying the language model, and one or more symbol fields indicating respective one or more symbols to be routed to the AR application component;
detecting using one or more cameras of the AR system and the language model, a start text entry gesture being made by a user of the AR system;
determining that the apparent location of the text scene component is correlated to a location in the real-world scene environment of a hand of the user while the user is making the start text entry gesture;
detecting, using the one or more cameras and the language model, one or more input symbols corresponding to fingerspelling signs being made by the user;
routing the one or more input symbols to the AR application component using the one or more input symbols and the one or more symbol fields of the component registration data;
generating entered text data based on the one or more input symbols; and
providing text in the text scene component based on the entered text data.

9. The computing apparatus of claim 8, wherein the instructions further cause the computing apparatus to perform operations comprising:
detecting, by the one or more processors, using the one or more cameras of the AR system, an end text entry gesture made by the user; and
terminating, by the one or more processors, on a basis of the detecting of the end text entry gesture, the text entry process.

10. The computing apparatus of claim 9, wherein the start text entry gesture and the end text entry gesture are a same gesture.

11. The computing apparatus of claim 8, wherein the language model comprises a hidden Markov model trained on a corpus of text related to a context of the text scene component.

12. The computing apparatus of claim 8, wherein the instructions causing the computing apparatus to perform the routing, using the component registration data, the entered text data to the AR application, further cause the computing apparatus to perform operations comprising:
classifying symbol input event data of the one or more input symbols as directed input event data based on the symbol input event data and the component registration data.

13. The computing apparatus of claim 8,
wherein the one or more input symbols include one or more editing commands, and
wherein the instructions causing the computing apparatus to generate the entered text data further cause the computing apparatus to perform operations comprising:
performing, by the one or more processors, an editing function on the entered text data.

14. The computing apparatus of claim 8, wherein the AR system comprises a head-worn device.

15. A non-transitory computer-readable storage medium, the computer-readable storage medium including instructions that when executed by a computer, cause the computer to perform operations of a text entry process, the operations comprising:
providing, by an AR system, to a user of the AR system, a text scene component in a user interface, the text scene component having an apparent location in a real-world scene environment, the text scene component associated with an AR application component;
determining a language model based on component registration data of the AR application component, the component registration data including a component ID field identifying the AR application component, a language field identifying the language model, and one or more symbol fields indicating respective one or more symbols to be routed to the AR application component;
detecting, using one or more cameras of the AR system and the language model, a start text entry gesture being made by a user of the AR system;
determining that the apparent location of the text scene component is correlated to a location in the real-world scene environment of a hand of the user while the user is making the start text entry gesture;
detecting, using the one or more cameras and the language model, one or more input symbols corresponding to fingerspelling signs being made by the user;
routing the one or more input symbols to the AR application component using the one or more input symbols and the one or more symbol fields of the component registration data;
generating entered text data based on the one or more input symbols; and
providing text in the text scene component based on the entered text data.

16. The non-transitory computer-readable storage medium of claim 15, wherein the instructions further cause the computer to perform operations comprising:
detecting using the one or more cameras of the AR system, an end text entry gesture made by the user; and
terminating on a basis of the detecting of the end text entry gesture, the text entry process.

17. The non-transitory computer-readable storage medium of claim 16, wherein the start text entry gesture and the end text entry gesture are a same gesture.

18. The non-transitory computer-readable storage medium of claim 15, wherein the language model comprises a hidden Markov model trained on a corpus of text related to a context of the text scene component.

19. The non-transitory computer-readable storage medium of claim 15, wherein the instructions causing the computer to perform the routing, using the component registration data, the entered text data to the AR application, further cause the computer to perform operations comprising:
classifying symbol input event data of the one or more input symbols as directed input event data based on the symbol input event data and component registration data of an AR application component of the text scene component.

20. The non-transitory computer-readable storage medium of claim 15,
   wherein the one or more input symbols include one or more editing commands, and
   wherein the instructions causing the computer to generate the entered text data further cause the computer to perform operations comprising:
   performing an editing function on the entered text data.

21. The non-transitory computer-readable storage medium of claim 15, wherein the AR system comprises a head-worn device.

* * * * *